United States Patent [19]
Noe et al.

[11] 4,360,137
[45] Nov. 23, 1982

[54] PLANETARY-GEAR DRIVE FOR LOOPER

[75] Inventors: Oskar Noe, Mühlheim; Rolf Noe, Berlin; Andreas Noe, Mühlheim, all of Fed. Rep. of Germany

[73] Assignee: BWG Bergwerk - und Walzwerk-Maschinenbau GmbH, Duisburg, Fed. Rep. of Germany

[21] Appl. No.: 169,493

[22] Filed: Jul. 15, 1980

[30] Foreign Application Priority Data

Aug. 16, 1979 [DE] Fed. Rep. of Germany ....... 2933017

[51] Int. Cl.³ .................... B65H 25/20; B65H 17/54
[52] U.S. Cl. .................................... 226/24; 226/119; 242/78.1
[58] Field of Search ................. 226/113, 114, 10, 45, 226/24, 36, 118, 119; 242/55.01, 47.5, 55, 75.5, 78, 78.1

[56] References Cited

U.S. PATENT DOCUMENTS

| 2,010,122 | 8/1935 | Wikle | 242/55.01 X |
| 2,292,511 | 8/1942 | Ferm | 226/119 X |
| 2,808,258 | 10/1957 | Waychoff | 242/55.01 |
| 3,051,362 | 8/1962 | Shook | 226/119 X |
| 3,386,638 | 6/1968 | Turner | 226/119 |

*Primary Examiner*—John M. Jillions
*Attorney, Agent, or Firm*—Karl F. Ross

[57] ABSTRACT

A looper has a fixed support carrying a plurality of guides and a movable support carrying a plurality of guides, with a strip being looped back and forth between the guides of the two supports. The movable support is connected via a cable or chain to a winch carried on a rotary output member of a planetary-gear transmission having two inputs. One of these inputs is rotated continuously at a predetermined speed while the other input is rotated at a variable speed determined by the rotation rate of the output member.

7 Claims, 8 Drawing Figures

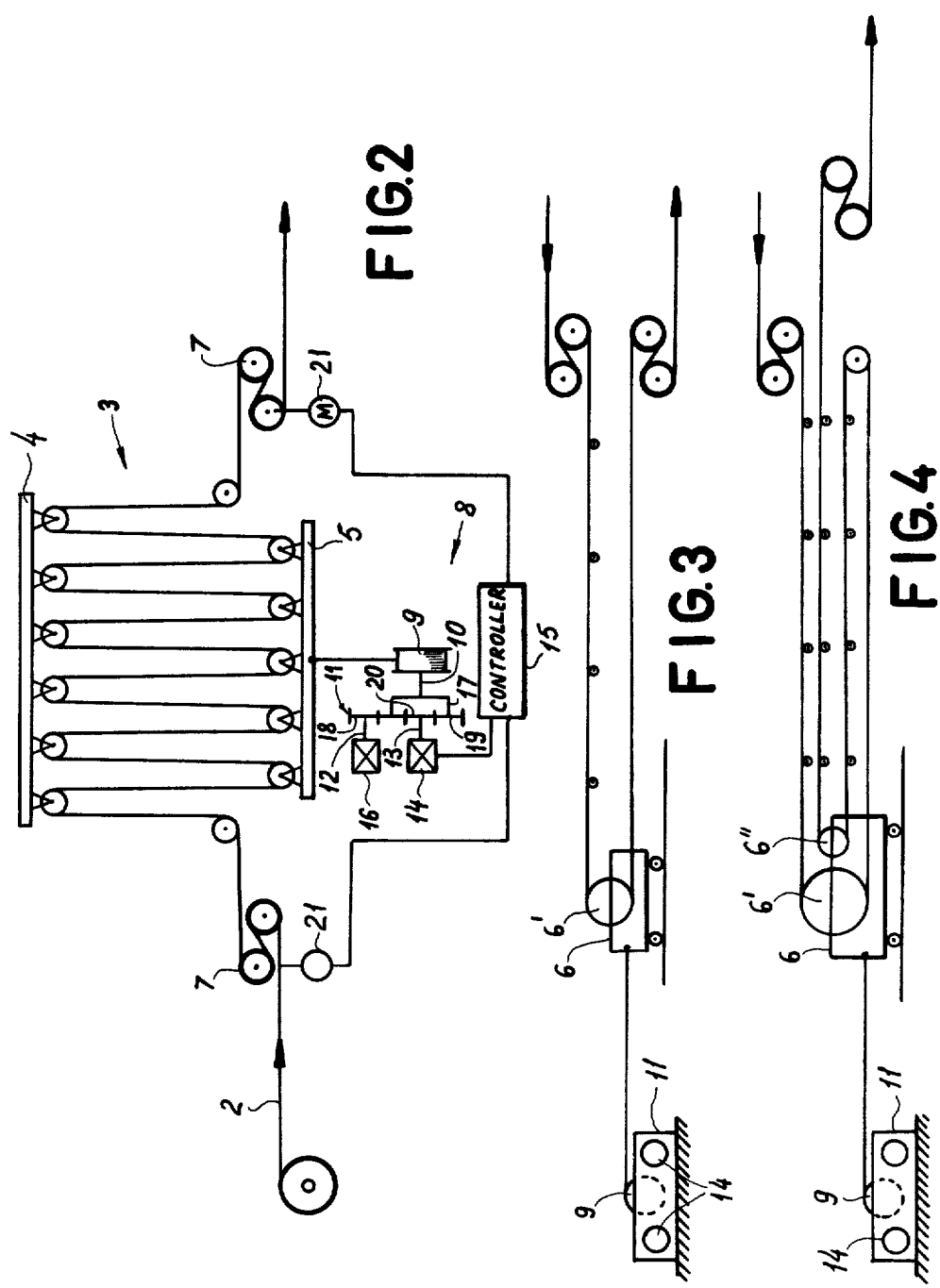

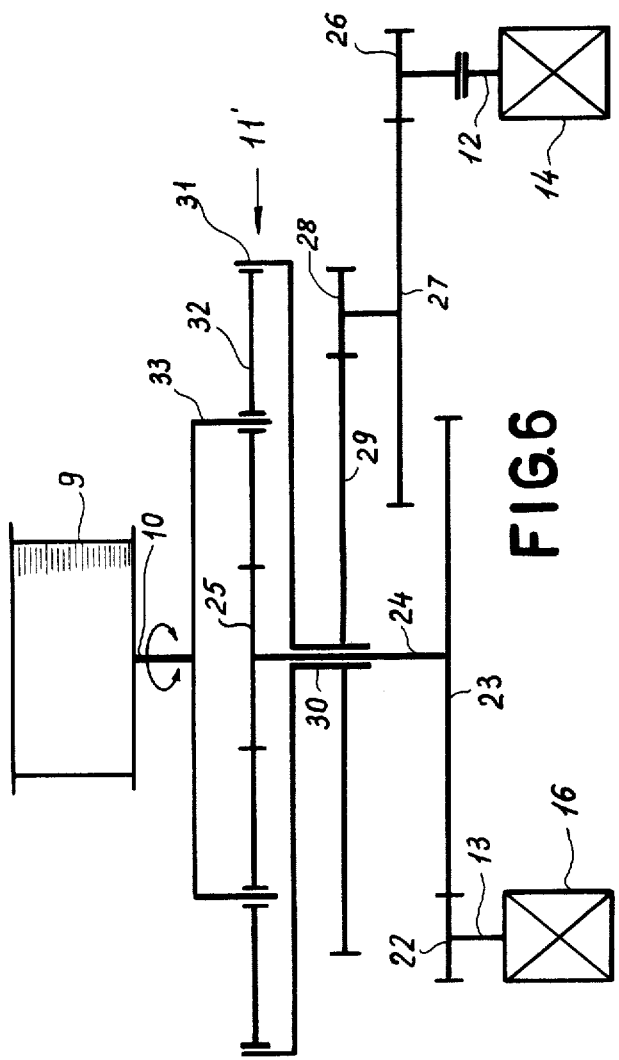
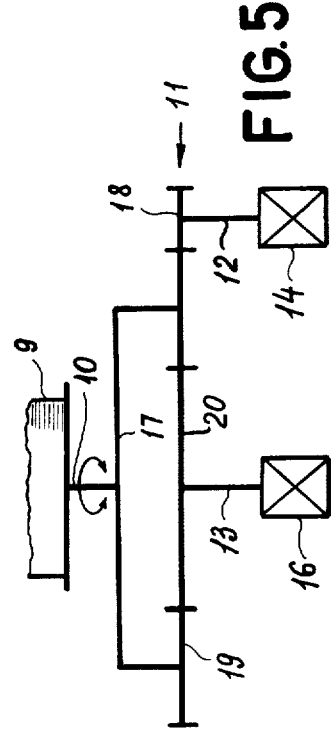

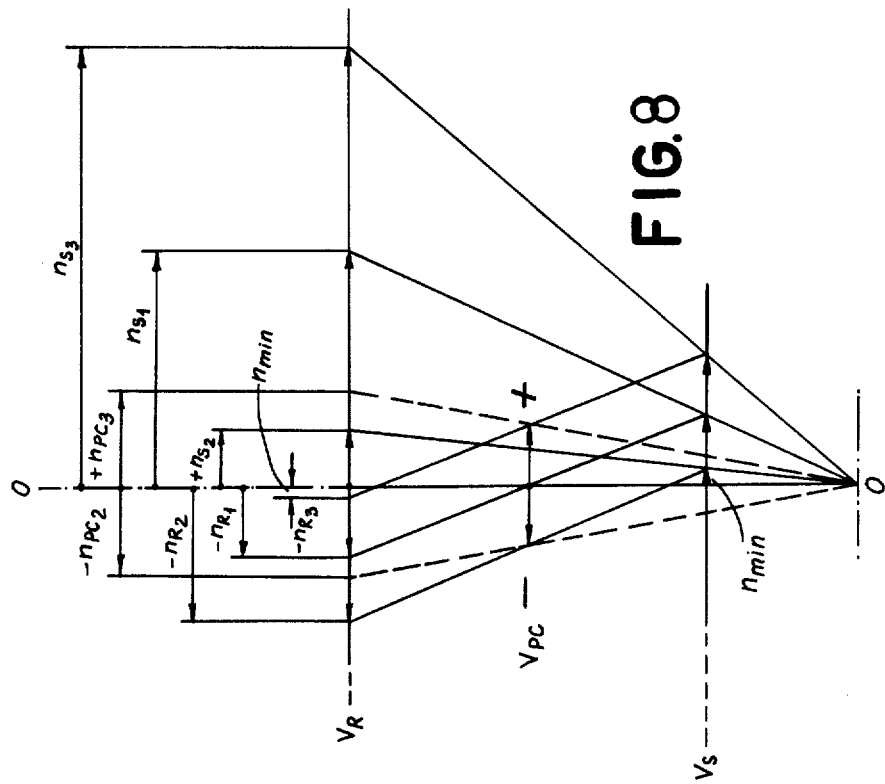
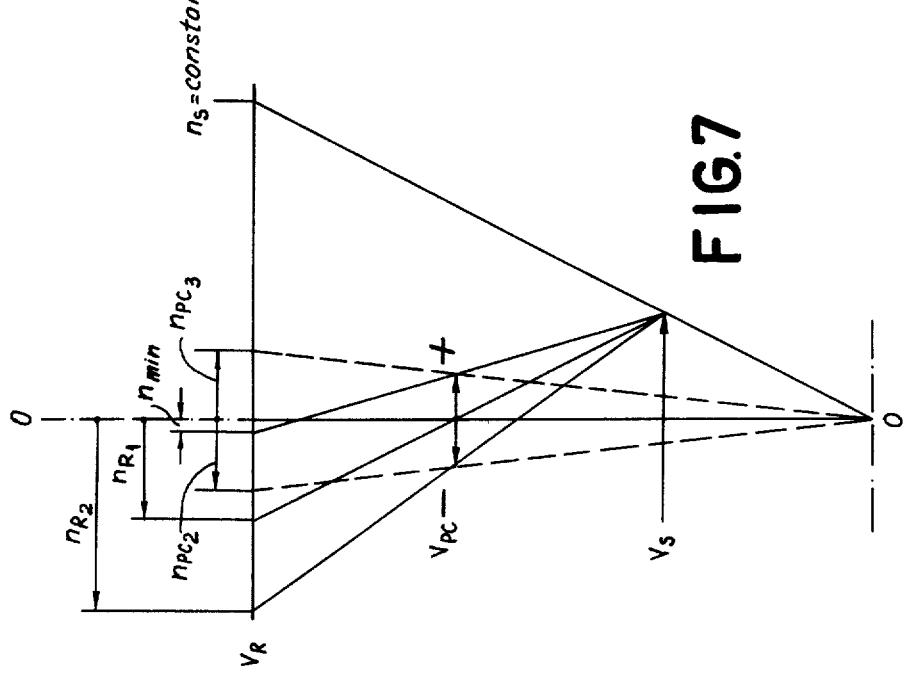

PLANETARY-GEAR DRIVE FOR LOOPER

FIELD OF THE INVENTION

The present invention relates to a looper of the type used in a steel mill. More particularly this invention concerns a drive for the movable car or guides of such a looper.

BACKGROUND OF THE INVENTION

In a steel mill it is frequently necessary to pass a piece of strip stock through a processing stage, unwinding the strip from a coil of the processing unit and winding it into a coil again downstream of the processing unit. Thus a sheet-steel strip is unwound prior to being pickled and galvanized and is rewound after such a process. Similar such operations can be carried out on nonmetallic strips, such as plastic strips or textiles that must be treated or printed.

For continuous operation the trailing end of the strip of one coil is normally joined to the leading end of another coil, to avoid the necessity of rethreading the entire system for each coil to be treated. Similarly at the downstream end of the process the coil must normally be unloaded from the takeup mandrel when it reaches a certain size and another coil started. For both of these operations a so-called looper is employed to allow the strip to be stopped evn though at an intermediate location the strip is still moving.

A looper, therefore, normally has a fixed support carrying a plurality of guides and a movable support carrying another plurality of guides, the strip being looped zig-zag fashion back and forth between the guides of the one support and the guides of the other support. Shifting the movable support toward the fixed support allows the strip to move downstream of the looper while being fixed upstream of the looper and shifting of the movable support away from the fixed support allows the band to move upstream of the looper while being stationary downstream of it.

Accordingly it is necessary to be able to displace this movable loop support in either of two directions at speeds varying between a maximum speed in one direction and a maximum speed in the opposite direction. The displacement speed and direction of the movable support is normally determined by the strip velocities established by tension bridles that normally flank each such looping unit, one of which is provided upstream of the treatment location and another downstream.

The standard drive for such an arrangement is simply constituted by a rotary member, normally a winch drum or sprocket, and means such as a cable or chain connecting the periphery of this drum to the movable support so that the movable support is displaced at a rate dependent on the peripheral speed of the rotary member and in a direction depending on the rotation sense of the rotary member. The speed of displacement of the movable support toward and away from the fixed support establishes the tension in the strip, since it is essential for the looper to maintain even strip tension. This drive is normally constituted as a heavy-duty direct-current electric motor of the reversible type whose output is connected via a gear-type transmission to the drum or sprocket constituting the rotary member.

Such a system leads normally to substantial speed variation for the movable support and to substantial variations in tension in the strip. In particular at very low rotation speeds the direct-current motor normally operates pulse-wise, and these pulses are transmitted to the loops of the strip and, in fact, is reflected by them to a relatively large extent since several such loops are engaged over the movable support. Furthermore at low speeds the friction between gears in the transmission is considerable so that the system heats greatly. This irregularity at low speeds is particularly disadvantageous with relatively fragile strip stock, as for instance synthetic resins. It produces transverse waves in the strip and can even rip it apart altogether.

OBJECTS OF THE INVENTION

It is therefore an object of the present invention to provide an improved looper.

Another object is to provide an improved drive for such a looper which eliminates the above-described speed variations even at low speeds.

SUMMARY OF THE INVENTION

These objects are attained according to the instant invention in a looper wherein the rotary member that displaces the movable support is driven by means of a planetary-gear transmission having a rotary output connected to the rotary member, two separate rotary inputs, and continuous-mesh gearing interconnecting the rotary inputs and output. Separate drive motors are connected to the inputs, with a fixed-speed drive motor connected to one of the inputs and a variable-speed drive motor being connected to the other input.

According to this invention both of these drive motors are operated continuously above predetermined respective minimum speeds. Thus the continuous-mesh gearing is always moving, even though the rotary output might be stationary. Hence the problems of irregularity at low speed, caused in part by commutating difficulties and in part by static friction in the prior-art systems, are wholly obviated. The system can easily be set up so that as the variable-speed drive motor is operated at its minimum speed the rotary output of the planetary-gear transmission is operating at maximum peripheral speed in one rotational sense, with this peripheral speed decreasing as the rotation speed of the variable-speed motor increases up to a certain point, whereupon it reverses and increases steadily in the opposite direction. All the problems inherent in low-speed operation are eliminated. The continous mesh of the gearing also substantially reduces lubrication problems for the transmission. Any oscillation of the movable support can normally be ascribed solely to variation between the operation speeds of the tension bridles that normally flank the looper upstream and downstream.

According to further features of this invention the planetary gear has, as is conventional, a sun gear, a plurality of planet gears meshing with the sun gear and carried on a planet carrier, and a ring gear in mesh with the planet gears. The sun gear can be driven at a constant RPM and the ring gear with a constant torque so that the carrier constitutes the output. The output can also be constituted by the ring gear with the sun gear and the carrier driven.

According to yet another feature of this invention the output speed of the variable-speed motor is controlled in accordance with the rotation rate of the rotary output member, which in turn is a function of the differential in speed between the bridles flanking the looper. Thus constant tension is ensured.

It is possible according to this invention for the transmission to be of a single-stage type as described above. Also two-stage planetary gearing may also be employed if desired.

BRIEF DESCRIPTION OF THE DRAWING

FIG. 2 is a more detailed schematic view of a looper according to this invention;

FIGS. 3 and 4 show two different arrangements for the looper according to the present invention;

FIG. 5 is a large-scale detail view of a one-drive stage system for the looper according to this invention;

FIG. 6 is a large-scale detail view of a multi-stage drive system for the looper of this invention;

FIG. 7 is a graph illustrating the instant invention with a constant speed for the sun gear; and FIG. 8 is a graph similar to FIG. 7 illustrating operation with a variable-speed sun gear.

SPECIFIC DESCRIPTION

Figure 1:
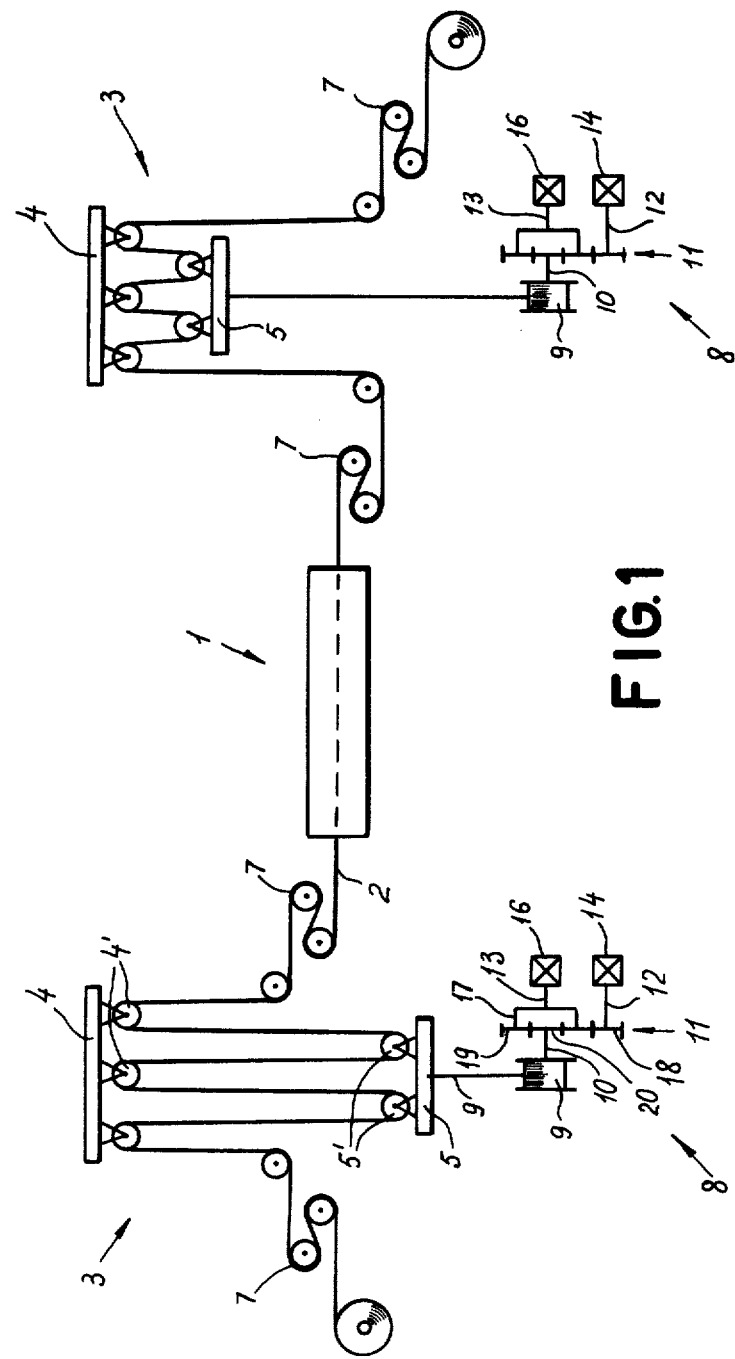
FIG. 1 is a largely schematic view of a system incorporating two loopers according to this invention.

FIG. 1 shows an arrangement wherein a steel strip 2 is passed through a pickling station 1 to either side of which is provided a looper 3. Each looper 3 has a stationary support 4 carrying a plurality of guide rollers 4' and a movable support 5 carrying a plurality of guide rollers 5', the strip 2 passing in loops between the rollers 4' and 5'. Tension bridles 7 are provided upstream and downstream of each of the loopers 3, and the movable support 5 is connected via a cable 9' with a rotary winch 9 carried on an output 10 of a drive 8.

FIG. 3 shows how the movable support 5 can be constituted by a single-loop car 6 having a single guide roller 6' or, as seen in FIG. 4, having a pair of guide rollers 6' and 6" to form a double guide. The loopers may be of the vertical tower, or pit type or of the horizontal type.

As further illustrated in FIG. 1, each of the drives 8 has a planetary-gear transmission 11 having an input 12 connected to a variable-speed drive motor 14 and an input 13 connected to a fixed-speed drive motor 16. The fixed-speed drive member 13 is constituted by the planet carrier 17 of the planetary gearing 11, the other input 12 is constituted by the ring gear 18 in mesh with the planet gears 19 of the carrier 17. The output member 10 is connected to the sun gear 20.

In FIG. 2 a controller 15 is shown connected to drive motors 21 for the bridles 7. This controller 15 can calculate the difference between the operation speeds of the bridles 7 and operates the variable-speed motor 14 at a speed directly related to the difference between the speeds of the motors 21, which in turn directly relates to the displacement speed of the output member 10. Thus the tension in the strip 2 remains constant. In FIG. 2 the variable-speed motor 14 is connected to the sun gear 20, the output 10 is connected to the planet carrier 17, and the fixed-speed motor 16 is connected via the input 12 to the ring gear 18.

FIG. 5 shows how the fixed-speed motor 16 is connected via the input 13 to the sun gear 20, the variable-speed motor is connected to the ring gear 18, and the output 10 is connected to the planet carrier 17.

In FIG. 6 the fixed-speed motor 16 is connected via the input 13 to a gear 22 meshing with a large-diameter pinion 23 carried on a shaft 24 connected to the sun gear 25 of a two-stage planetary-gear assembly 11'. The variable-speed motor 14 is connected via the input 12 and its small-diameter pinion 26 to a large-diameter gear 27 connected in turn to a small-diameter gear 28 meshing with another large-diameter gear 29 carried on a shaft 30 in turn carrying a ring gear 31. Planet gears 32 mesh on one side with the ring gear 31 and on the other side with the sun gear 25 and are carried on a planet carrier 33 connected to the output 10.

The motors 14 and 16 can be hydraulic or electric motors and are always operated above a predetermined minimum speed.

FIGS. 7 and 8 illustrate the various rotation speeds n and velocities V of the sun gear ($n_S$ and $V_S$), ring gear ($n_R$ and $V_R$), and planet carrier ($n_{PC}$ and $D_{PC}$). In both of these graphs the output 10 is formed by the planet carrier.

According to FIG. 7 the speed $V_S$ or rotation speed $n_S$ is constant. In FIG. 8 the speed $V_S$ of the sun gear increases as the speed $V_R$ of the ring gear increases. In this case the sun gear is driven with variable RPM and speed. This operation between sun gear and ring gear creates a particularly advantageous looper drive.

Both speed and RPM charts show that the inputs 12 and 13 always remain the same as far as their rotation directions, while remaining above a minimum RPM $n_{min}$. The output 10 can be taken off the ring gear also according to this invention with the sun gear and planet carrier being driven.

Thus with the system according to the instant invention it is possible to operate both the inputs of the planetary-gear transmission at relatively high speeds to eliminate the difficulties of controlling speed accurately with low-speed operation. Nonetheless since the two inputs are summed the output can operate in either direction and at any speed within a wide range.

We claim:

1. A strip looper comprising:
   a relatively fixed support carrying a set of guides;
   a movable support carrying another set of guides, at least one of said sets having more than one such guide, the strip being looped back and forth over said guides;
   a rotary member having a periphery;
   means connecting said periphery to said movable support for displacement thereof relative to said fixed support at a velocity dependent on the peripheral speed of said periphery and in a direction dependent on the rotation sense of said periphery;
   a planetary-gear transmission having a rotary output connected to said rotary member, two separate rotary inputs, and continuous-mesh gearing interconnecting said inputs and outputs;
   a substantially fixed-speed drive motor connected to one of said inputs; and
   a variable-speed drive motor connected to the other of said inputs.

2. The looper defined in claim 1, further comprising control means for operating said drive motors at respective output speeds above respective predetermined minimum speeds.

3. The looper defined in claim 2, further comprising tension bridles flanking said looper and engaging said strip upstream and downstream of said looper.

4. The looper defined in claim 3 wherein said control means is connected to said bridles for operating said variable-speed motor at a rate dependent on the difference between the throughput rates of said bridles.

5. The looper defined in claim 1 wherein said gearing includes a sun gear, a planet gear meshing with and orbital about said sun gear, a planet carrier carrying said planet gear, and a ring gear meshing with said planet gear and surrounding said sun gear.

6. The looper defined in claim 5 wherein one of said gears is one of said inputs.

7. The looper defined in claim 5 wherein said carrier is said output and the other of said gears is the other input.

* * * * *